United States Patent [19]
Duran

[11] 4,404,714
[45] Sep. 20, 1983

[54] COUPLING MECHANISM
[75] Inventor: John A. Duran, Glendora, Calif.
[73] Assignee: Avibank Mfg., Inc., Burbank, Calif.
[21] Appl. No.: 104,167
[22] Filed: Dec. 17, 1979
[51] Int. Cl.³ .................... A44B 11/25; A44B 17/00
[52] U.S. Cl. ............................ 24/230 AL; 24/211 R;
403/322; 403/325; 403/328
[58] Field of Search .......... 24/230 AL, 211 R, 211 L;
403/322, 325, 328, 354

[56] References Cited
U.S. PATENT DOCUMENTS

| | | | |
|---|---|---|---|
| 3,276,799 | 10/1966 | Moore et al. | 403/316 |
| 3,280,439 | 10/1966 | McCarthy | 24/211 R |
| 3,793,685 | 2/1974 | Knecht | 24/230 AL |

FOREIGN PATENT DOCUMENTS 893986 5/1960 United Kingdom ............ 24/211 L

Primary Examiner—Alexander Grosz
Attorney, Agent, or Firm—Poms, Smith, Lande & Rose

[57] ABSTRACT

A coupling mechanism is disclosed which is adapted for transverse coupling to a keeper pin. A housing is provided for transversely receiving the keeper pin. Detent bodies associated with the housing are included for releasably coupling to the keeper pin. A sleeve is slidably associated with the housing for releasably locking the detent bodies in a coupled position with the keeper pin. A spring is included for normally biasing both the detent bodies and the sleeve to the detent locking position.

3 Claims, 8 Drawing Figures

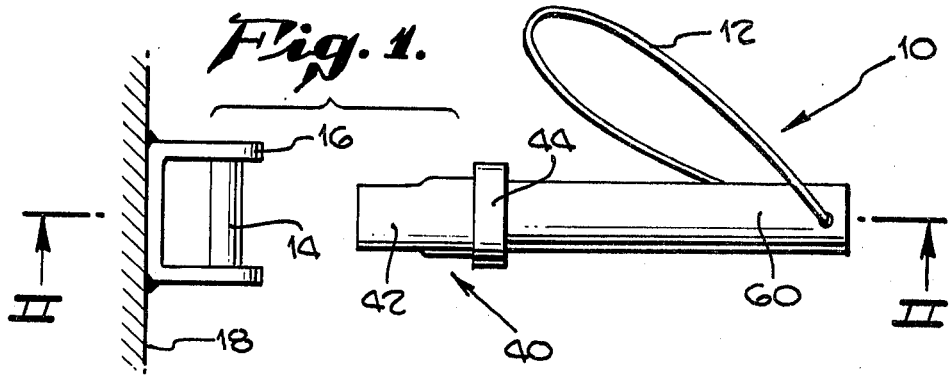
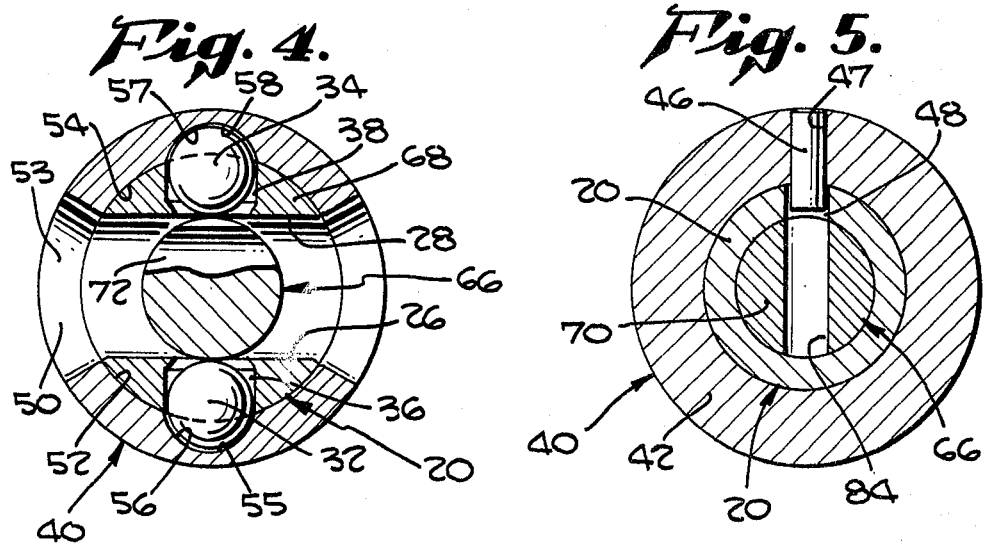
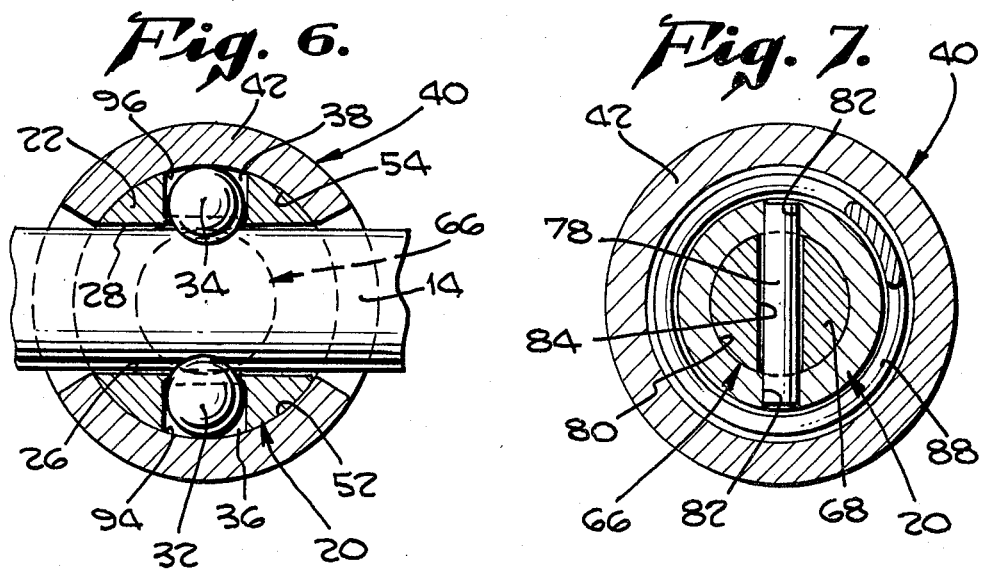

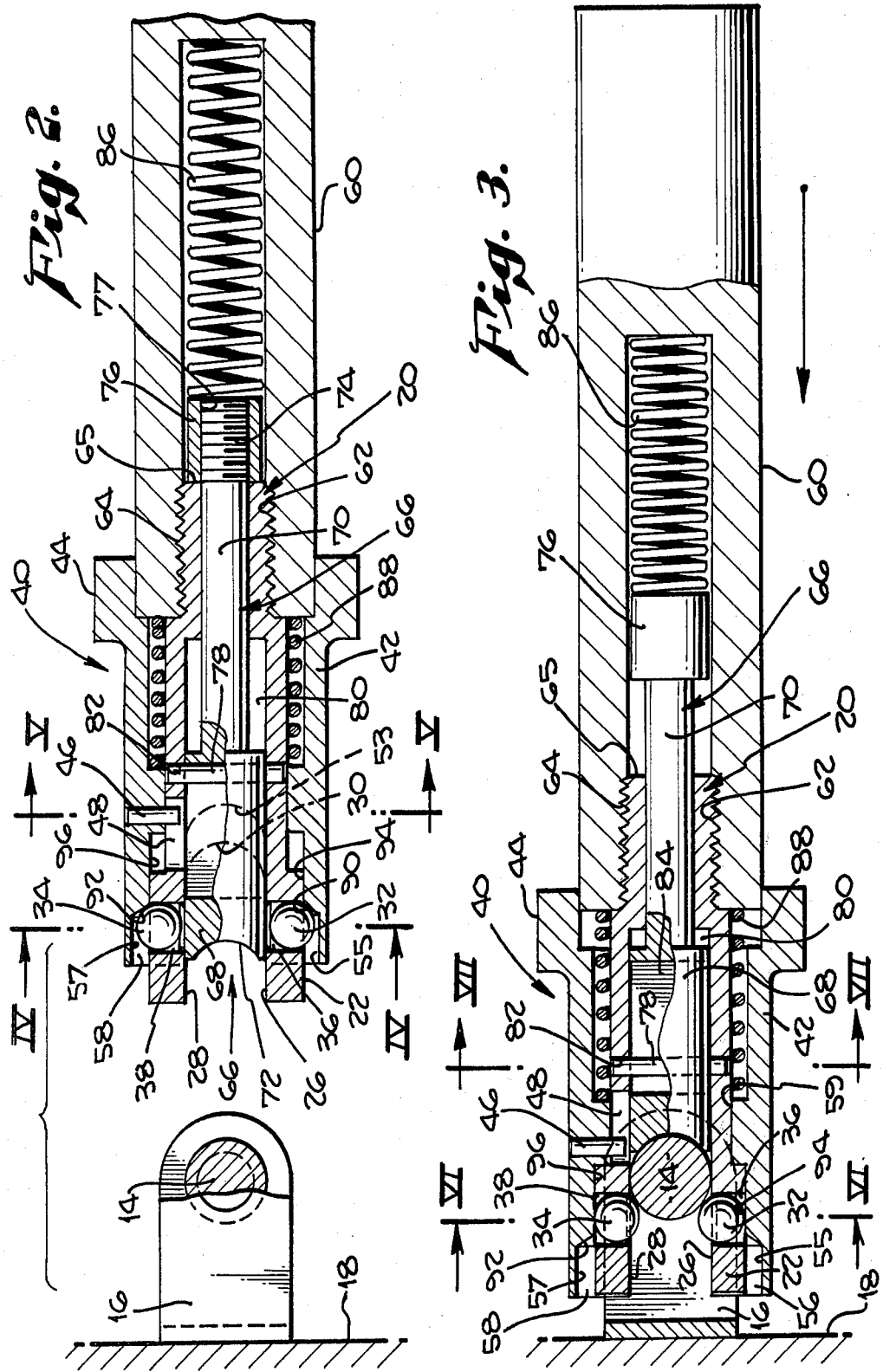

COUPLING MECHANISM

BACKGROUND OF THE INVENTION

The present invention relates generally to coupling mechanisms. More specifically, the present invention relates to coupling mechanisms of the quick disconnect variety.

The uses for quick disconnect couplers are many and varied. They are widely employed in connecting cables, air hoses, hydraulic lines and the like. Prior art quick disconnect couplers are characterized by coupling mechanisms having a male and female member. The male member is a shaft-like extension which couples axially with the female member which is generally a tubular housing.

U.S. Pat. No. 3,793,685 issued to Knecht on Feb. 26, 1974 is typical of such prior art quick disconnect couplers. Knecht discloses the male member as a shaft-like extension having an annular groove for coupling with ball detents which are located in the female tubular housing. When the shaft is inserted into the tubular housing, the ball detents couple with the annular groove. A sleeve is provided on the tubular housing which is slidable to a position which prevents the ball detents from moving radially outward from the grooves thereby locking the shaft and tubular housing together. The two members are disconnected by sliding the sleeve to a position which allows radial movement outward of the ball detents away from the annular groove on the shaft.

U.S. Pat. No. 3,138,393 issued to Livingston on June 23, 1964, also discloses a quick disconnect type coupler which couples axially and is based on the same principle of a ball detent coupling with a groove in the male shaft-like member with a sleeve provided for releasable locking of the ball detent to the groove in the male member. U.S. Pat. No. 2,461,699 issued to Scheiwer and U.S. Pat. No. 3,276,799 issued to Moore et al. also depict prior art quick disconnect mechanisms functioning similarly to the Knecht and Livingston patents.

The prior art quick disconnect couplers, as characterized by the Knecht patent, are all restricted to axial coupling in which a male shaft-like member must be inserted axially into a female tubular housing. It would be desirable to have a quick disconnect type coupler which could be coupled transversely with the male shaft-like member. This type of transverse coupling is especially desirable in situations where quick connecting of a cable or other member is required at various positions along a rail, rod or the like.

Exemplary of a prior art coupling mechanism for transversely coupling to a male member or keeper pin is U.S. Pat. No. 3,280,439 issued to McCarthy on Oct. 25, 1966. The McCarthy patent does not use the ball detent coupling concept utilized in prior art devices for axial coupling. The McCarthy patent utilizes a notch extending transversely of the axis of the plug part to couple transversely to a keeper pin. Locking of the keeper pin within the transverse notch is accomplished by a socket having the keeper pin displaced therein whereby the socket aligns the plug part to prevent movement of the keeper pin out of the transverse notch. McCarthy also discloses the use of a slidable locking member to lock the keeper pin within the transverse notch.

It would be desirable to provide a coupling mechanism which is capable of being transversely coupled to a keeper pin from any direction without the need for sockets and the like to accomplish coupling. It would also be desirable to provide a coupling mechanism wherein the keeper pin is biased to a firmly coupled position thereby reducing any play or looseness in the coupling.

The prior art ball detent type couplers provide a secure means for axial coupling but cannot be used for transverse coupling. The McCarthy patent, while providing for transverse coupling, additionally requires the use of a special socket to align the coupling elements. Loosening and play in the McCarthy device may also occur as the transverse notch becomes worn with repeated use.

It is therefore an object of the present invention to disclose and provide a coupling mechanism which may be coupled transversely to a keeper pin or rod at any point along the keeper pin and from any direction in a plane substantially normal to the keeper pin.

Another object of the present invention is to disclose and provide a coupling mechanism which does not require a socket or other alignment means for transverse coupling to a keeper pin.

A further object of the present invention is to disclose and provide a coupling mechanism adapted for coupling to a keeper pin wherein the keeper pin is biased within the coupling mechanism to provide a firm coupling relationship having no play or looseness even upon repeated coupling.

A final object of the present invention is to disclose and provide a coupling mechanism which can be quickly, conveniently and easily coupled transversely to a keeper pin or rod.

SUMMARY OF THE INVENTION

The present invention discloses a coupling mechanism which is adapted for transverse coupling to a keeper pin. The coupling mechanism is composed of a housing having a front portion adapted for transversely receiving the keeper pin. Detent means associated with the housing is provided for releasably coupling to the keeper pin. The detent means is movable between coupled and uncoupled positions with the keeper pin.

Sleeve means which is slidably associated with the housing is provided for releasably locking the detent means in the coupled position. The sleeve means is movable between a position which locks the detent means in the coupled position and a position which allows movement of the detent means to an uncoupled position.

Biasing means are provided for biasing the detent means to its coupled position and the sleeve means to its detent locking position.

The coupling mechanism further includes a slidable keeper pin receiving member which is located in the housing. The keeper pin receiving member is normally biased in a direction whereby the detent means abuts against the keeper pin receiving member, thereby retaining the detent means in their uncoupled position until the keeper pin receiving member is moved against its bias to thereby release the detent means permitting it to move to its coupled position.

BRIEF DESCRIPTION OF THE DRAWINGS

FIG. 1 is a view showing generally the preferred embodiment of the coupling mechanism of the present invention and the keeper pin to which it may be attached.

FIG. 2 is a detailed view of FIG. 1 taken in the II—II plane showing the preferred coupling mechanism and keeper pin in an uncoupled configuration.

FIG. 3 is a detailed cross-sectional view taken in the II—II plane of FIG. 1 showing the preferred coupling mechanism and keeper pin in a coupled configuration.

FIG. 4 is a cross-sectional view taken in the IV—IV plane of FIG. 2.

FIG. 5 is a cross-sectional view taken in the V—V plane of FIG. 2.

FIG. 6 is a cross-sectional view taken in the VI—VI plane of FIG. 3.

FIG. 7 is a cross-sectional view taken in the VII—VII plane of FIG. 3.

DETAILED DESCRIPTION OF THE PREFERRED EXEMPLARY EMBODIMENT

Figure 8:
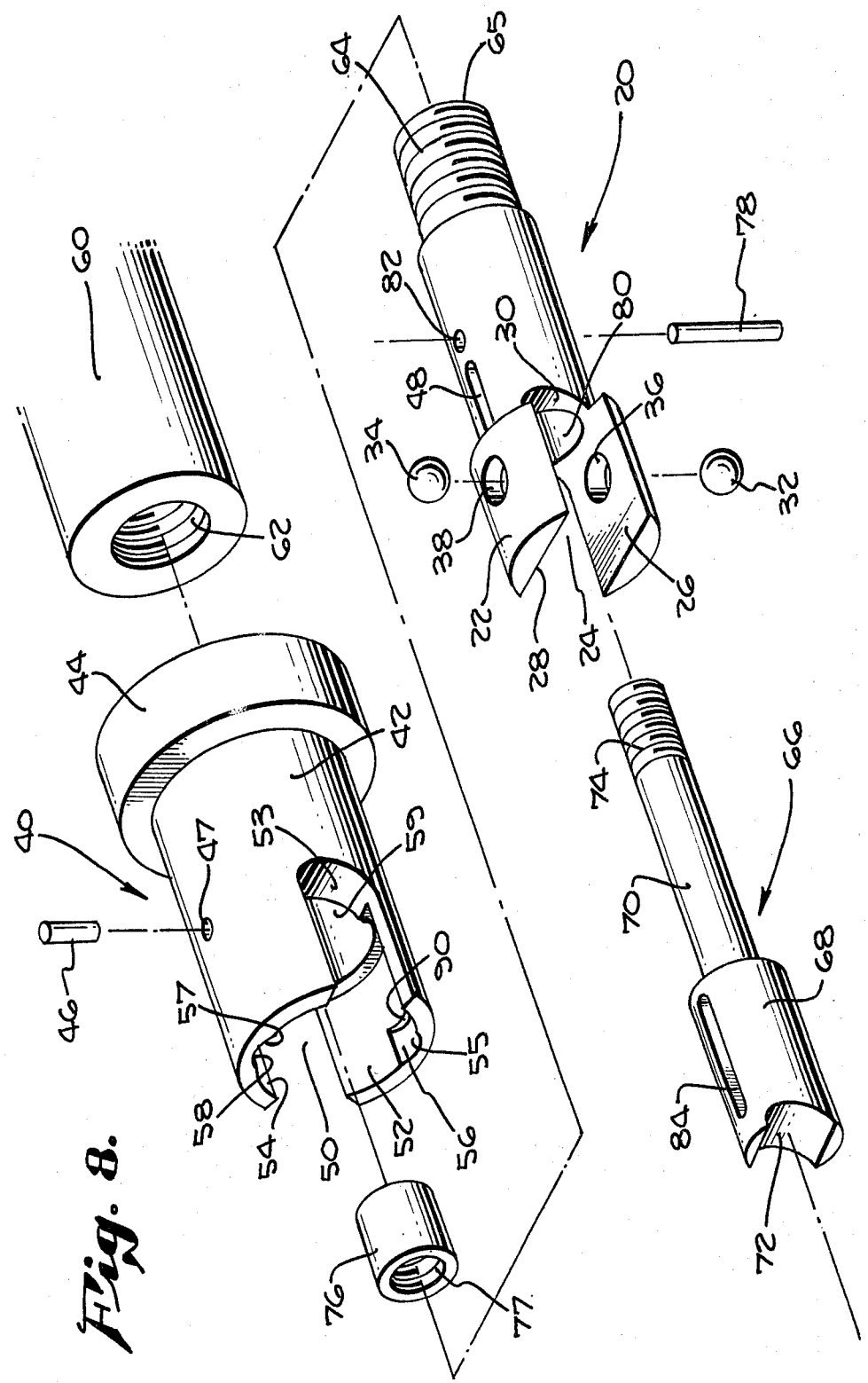
FIG. 8 is a detailed exploded view of the preferred coupling mechanism of the present invention.

The preferred exemplary embodiment of the coupling mechanism of the present invention is shown generally at 10 is FIG. 1. The coupling mechanism 10 is shown having a strap 12 for hanging the coupling mechanism 10 on a hook, individual's wrist or the like, if desired. The strap 12 is only shown as a convenience feature and is in no way involved in the operation of the coupling mechanism.

FIG. 1 also shows an elongated member such as keeper pin 14 which is mounted within a frame 16 with the frame being secured to a surface 18. It is not necessary that the keeper pin 14 be of the length shown or that it be secured to a frame 16.

FIG. 8 shows an exploded view of the major components of the preferred coupling mechanism 10. A housing shown generally at 20 has a front portion 22 which is slotted as at 24 to transversely receive the keeper pin 14. The transverse slotting of the front portion 22 leaves a bottom surface 26, a top surface 28 and a rear curved surface 30.

Detent means is provided for releasably coupling to the keeper pin 14. Such detent means preferably include balls 32 and 34. The balls 32 and 34 are associated with the front portion 22 via holes 36 and 38 respectively. The balls 32 and 34 are movable between coupled positions as shown in FIG. 6 and uncoupled positions as shown in FIG. 4.

Sleeve means is provided for releasably locking the balls 32 and 34 in their coupled positions. Such sleeve means preferably include the sleeve shown generally at 40. The sleeve 40 has a front portion 42 and a rear portion 44. The sleeve 40 fits slidably over the housing 20. Slidable movement and axial rotation of the sleeve 40 relative to the housing 20 is restricted by sleeve pin 46 which fits into housing groove 48 as shown in FIGS. 2, 3 and 5 thereby restricting movement of the sleeve 40 to movement of the sleeve pin 46 within the housing groove 48.

The sleeve front portion 42 is slotted as at 50 to allow transverse movement of the keeper pin 14 into the housing slot 24. The slotting of the sleeve front portion 42 leaves a bottom surface 52, a top surface 54, and a rear curved surface 53. The sleeve top and bottom surfaces 52 and 54 have notches 56 and 58 for receiving the balls 32 and 34 when they are in an uncoupled position as shown in FIGS. 4 and 2. The notches 56 and 58 have detent body contact surfaces 55 and 57 which prevent further outward movement of the balls 32 and 34 when the balls 32 and 34 are in the uncoupled position as shown in FIG. 2.

The sleeve rear portion 44 is adapted for slidable movement relative to the plunger housing 60. The plunger housing 60 is threaded as at 62 for being secured to threads 64 located on the rear end 65 of the housing 20. The plunger housing 60 is shaped to allow slidable movement of the sleeve 40 as restricted by pin 46 and groove 48.

A keeper pin receiving member is shown generally at 66. The keeper pin receiving member 66 has a head 68 and a body 70. Keeper pin head 68 is provided on its front end with a curved surface 72 which is shaped so as to uniformly contact the keeper pin 14 as it is inserted into the coupling mechanism 10. Curved surface 72 is so curved to provide a means for engaging the keeper pin 14 from any direction in a plane generally normal to the longitudinal axis of the keeper pin 14. The keeper pin body 70 is threaded on its rear end at 74. The threads 74 are used to attach the plug 76 to the keeper pin body 70. The plug 76 maintains alignment of the keeper pin receiving member 66 centrally within the plunger housing 60. The plug 76 also serves as a blocking member to prevent the keeper pin receiving member 66 from sliding out of the plunger housing 60 and housing 20. This is accomplished by abutment of the plug 76 against the rear end 65 of the housing 20 as best shown in FIG. 2.

Housing pin 78 extends transversely through axial hole 80 in housing 20 and is secured to the housing 20 by way of attachment holes 82. Groove 84 in the keeper pin head 68 extends entirely through the keeper pin head 68 and receives the housing pin 68 as shown in FIGS. 2, 3 and 7. The placement of the housing pin 78 within the keeper pin head groove 84 restricts axial slidable movement and axial rotation of the keeper pin receiving member 66 to movement of the housing pin 78 within the keeper pin head groove 84.

Having briefly described the major components of the preferred coupling mechanism 10 as depicted in the exploded view of FIG. 8, a more detailed description of the preferred coupling mechanism 10 and its operation will now be given. Reference will be made to FIGS. 2 and 3.

Assembly of the preferred coupling mechanism 10 is accomplished by inserting the keeper pin body 70 into the axial hole 80 so that the threaded portion 74 protrudes out of the rear end of the housing 20. The plug 76 is then attached to the threaded end 74 by way of threads 77. The keeper pin receiving member 66 is aligned by inserting housing pin 78 through attachment holes 82 and keeper pin groove 84. The balls 32 and 34 are then placed in their respective holes 34 and 36 and the combined keeper pin receiving member 66 and housing 20 are slid axially into sleeve opening 59. The housing 20 is then secured to the plunger housing 60 by way of threads 64 on the housing 20 and threads 62 within the plunger housing 60. The sleeve pin 46 is inserted through the sleeve pin hole 47 into housing groove 48. The sleeve pin 46 is inserted so that the top of the sleeve pin 46 remains flush with the top of the sleeve pin hole 47. The insertion of sleeve pin 46 into housing groove 48 thereby restricts movement of the sleeve 40 relative to housing 20.

Both FIGS. 2 and 3 show the perferred coupling mechanism 10 when it is completely assembled. FIG. 2 demonstrates the preferred coupling mechanism 10 in the uncoupled position. FIG. 3 shows the preferred coupling mechanism 10 in the coupled position with the keeper pin 34.

First referring to FIG. 2, the keeper pin receiving member 66 is in its full forward position. The keeper pin receiving member 66 is urged to this position by keeper pin biasing means such as spring 86. In the full forward position, the keeper pin head 68 abuts the balls 32 and 34 thereby preventing them from falling into the housing slot 24. The sleeve 40 is in its rearward position and is held there by the balls 32 and 34 which are lodged in the sleeve notches 56 and 58 respectively.

Biasing means for normally biasing the sleeve 40 to the forward position includes spring 88. As the keeper pin 14 engages the keeper pin head curved surface 72, the keeper pin receiving member 66 is moved rearwardly against its spring bias 86. The spring 88 is constantly urging the sleeve 40 forward against the balls 32 and 34. Once the keeper head pin 68 has been moved rearward of the balls 32 and 34, the sleeve 40 will be forced forward by its spring bias 88 thereby forcing the balls 32 and 34 inwardly.

Since the keeper pin 14, as it is forced against the keeper pin receiving member 66, is tight against the curved surface 72, the balls 32 and 34 cannot be forced inwardly until after the keeper pin 14 has also moved rearwardly of the balls 32 and 34. This is the condition shown in FIG. 3. Once the keeper pin 14 has moved rearwardly of the balls 32 and 34, the balls 32 and 34 are forced into their coupled position by the sleeve 40 and its biasing spring 88. The notches 56 and 58 are provided with inwardly sloping biasing surfaces 90 and 92 which translate the forward slidable movement of the sleeve 40 into inward movement of the balls 32 and 34.

In the coupled position of FIG. 3, the sleeve 40 has been urged by the spring bias 88 to its full forward position presenting flat locking surfaces 94 and 96 abutting the balls 32 and 34 thereby preventing outward movement of the balls 32 and 34 from their coupled position. The spring bias 86 constantly exerts pressure via the keeper pin receiving member 66 against the keeper pin 14 to maintain pressure on the keeper pin against the balls 32 and 34. This forward bias maintains a secure coupling between the keeper pin 14 and the balls 32 and 34.

To release the preferred coupling mechanism 10 from the keeper pin 14, the sleeve 40 is slidably moved rearwardly against its spring bias 88 to a position where the balls 32 and 34 may be forced into notches 56 and 58 respectively on the front portion of the sleeve 42. Since spring bias 86 is constantly forcing the keeper pin receiving member 66 forwardly, it urges the keeper pin 14 against the balls 32 and 34 so that they are outwardly moved into notches 56 and 58. The keeper pin 66 receiving member continues to move forwardly until it is in its full forward position as shown in FIG. 2 where it prevents inward movement of the balls 32 and 34 thereby locking the sleeve 40 in its rearward position. The above mentioned release of the coupling mechanism 10 may be accomplished quickly and easily by grasping the coupling mechanism 10 in one hand and simply pulling the sleeve 40 rearwardly with the fingers.

Although the coupling mechanism 10 of the present invention is shown being coupled to a keeper pin which is mounted inside of a frame 16, it can readily be seen that the coupling mechanism 10 may be attached to any type of an elongated member where quick attachment and quick release is desirable. Additionally, it can be seen that no type of axial alignment or other positioning sockets are necessary for coupling to be accomplished other than the insertion of the keeper pin 14 within the transverse slots 24 and 50 provided on the coupling mechanism 10.

It should also be noted that initial coupling of the coupling mechanism 10 to the keeper pin 14 is automatic. For example, the sleeve 40 must not be manually moved or otherwise manipulated to allow initial engagement of the coupling mechanism 10 with the keeper pin 14. The coupling mechanism 10 is simply thrust against the keeper pin 14 so as to move the keeper pin receiving member 66 sufficiently rearward to allow coupling.

It is to be realized that only the preferred exemplary embodiment of the present invention has been described and that numerous modifications and alterations are permissible without departing from the spirit and scope of the invention. For example, the number of balls 32 and 34 could be varied so long as at least one ball is provided for coupling and the balls are positioned so as not to interfere with the transverse movement of the keeper pin into the transverse slots on the coupling mechanism. Another example would be a coupling mechanism where the balls were forced outwardly rather than inward to accomplish coupling engagement or where biasing was accomplished by other than spring means. These examples are illustrative only and are not intended to limit the scope of the invention as defined in the following claims.

I claim:

1. A coupling mechanism adapted for transverse coupling to a keeper pin which comprises:

a housing having a slotted front portion adapted to transversely receive a keeper pin, said slot extending coaxially with the longitudinal axis of said housing;

detent means associated with said housing for releasably coupling a keeper pin and movable between coupled and uncoupled positions;

a slidable keeper pin receiving member mounted in said housing having a forward end engagable by a keeper pin and keeper pin biasing means associated therewith for normally biasing said member in a direction whereby said detent means abuts against said keeper pin receiving member, thereby retaining said detent means in said uncoupled position until said keeper pin receiving member is moved against its bias to thereby release said detent means permitting said detent means to move to its coupled position, said keeper pin receiving member having a plug attached to its end remote from said forward end and said plug being adapted to abut against the end of said housing remote from said slotted front portion when said keeper pin receiving member is mounted in said housing;

sleeve means slidably associated with said housing for releasably locking said detent means in said coupled position and movable between a position locking said detent means in said coupled position and a position allowing movement of said detent means to said uncoupled position, said sleeve means being slotted to transversely receive a keeper pin, said sleeve means slot extending coaxially with the longitudinal axis of said housing, said sleeve means further including a detent body contact surface displaced sufficiently from said housing to permit movement of said detent bodies into said uncoupled position when said sleeve means is in said detent movement allowing position and a locking portion having a locking surface rearward of said front portion, said locking surface retaining said detent bodies in said coupled position when said sleeve means is in said detent locking position; and biasing means for biasing said detent bodies to said coupled position and said sleeve means to said detent locking position including an inwardly sloping biasing surface which connects said front portion detent body contact surface with said locking surface whereby forward slidable movement of said biasing surface when said biasing surface is in contact with said detend bodies causes inward movement of said detent bodies toward said coupled position and a spring for urging said biasing surface in said forward direction.

2. The coupling mechanism according to claim 1 wherein said detent means include at least two detent bodies associated with said housing at spaced locations adapted to transversely couple to an elongated keeper pin of round cross-section.

3. The coupling mechanism according to claim 1 which additionally includes an elongated keeper pin of round cross-section for coupling to said detent means.

* * * * *